United States Patent
Hara et al.

[15] 3,658,166
[45] Apr. 25, 1972

[54] CONVEYING APPARATUS WITH ENDLESS CHAIN MEANS

[72] Inventors: Takeshi Hara, Katsuta; Shoichi Nakao, Mito; Katsuya Teranishi, Katsuta, all of Japan

[73] Assignee: Hitachi, Ltd., Tokyo, Japan

[22] Filed: Apr. 1, 1970

[21] Appl. No.: 24,753

[30] Foreign Application Priority Data

Apr. 4, 1969 Japan....................................44/25558

[52] U.S. Cl................................................198/16, 198/203
[51] Int. Cl.......................................B65g 23/00, B65g 65/28
[58] Field of Search.........................198/16, 17, 18, 203, 145; 74/243

[56] References Cited

UNITED STATES PATENTS

| | | | |
|---|---|---|---|
| 2,225,772 | 12/1940 | Dunlop | 198/16 |
| 3,233,721 | 2/1966 | Redden | 198/145 |
| 2,633,354 | 3/1953 | Mixer | 74/243 |
| 1,430,906 | 10/1922 | John | 198/16 |

FOREIGN PATENTS OR APPLICATIONS 724,088   4/1932   France..................................198/16

Primary Examiner—Richard E. Aegerter
Attorney—Craig, Antonelli & Hill

[57] ABSTRACT

Conveying apparatus provided with chain transmission means having an endless chain passing around a pair of sprockets, said chain transmission means further comprising an intermediate sprocket having involute teeth and disposed for meshing engagement with the endless chain on the tight side thereof, said intermediate sprocket being driven so as to move said endless chain.

9 Claims, 6 Drawing Figures

Patented April 25, 1972

INVENTOR
TAKESHI HARA
SHOICHI NAKAO
KATSUYA TERANISHI

BY Craig, Antonelli, Stewart & Hill

ATTORNEY

CONVEYING APPARATUS WITH ENDLESS CHAIN MEANS

The present invention relates to a conveying apparatus provided with endless chain means, and more particularly to a conveying apparatus provided with endless chain means which may conveniently be used in a moving path or an escalator by securing a plurality of step plates to said endless chain means.

In the past, an escalator or a moving path having endless chain means has been driven, for example as disclosed in United States Pat. No. 2,649,181, by a motor connected to one of the sprockets around which an endless chain passes. However, since the tension in the endless chain amounts to a maximum value at the portion where the driving sprocket engages therewith, in the above mentioned known arrangement in which the chain is driven by only one driving sprocket, an endless chain of a large capacity will be required where the moving path or the escalator is long.

Recently, due to the big demand for buildings or other requirements, a long moving path or a high-lift escalator has been made use of, and, therefore, a chain possessing substantial strength is needed.

However, in a moving path of an excessive length or in an escalator of great height, a chain must be made, in order to obtain sufficient strength, so as to have substantial dimensions, capacity and pitch, etc., so that the total dimension of the moving path or the escalator is uneconomically increased and the chain itself becomes expensive to manufacture. Further, since a driving means for driving the sprocket is disposed at one end of the moving path or the escalator, the effective conveying portion thereof must be greatly decreased.

An object of the present invention is to provide a novel driving means for an endless chain.

Another object of the present invention is to provide a conveying apparatus having endless chain means in which a chain of small capacity can be utilized.

A further object of the present invention is to provide a conveying apparatus which can effectively be used over a long moving path or in an escalator of great height.

These and other objects of the present invention will be understood from the following description with respect to an embodiment of the present invention.

According to the present invention, there is provided a conveying apparatus comprising a frame, at least one chain transmission means mounted on said frame; each of said chain transmission means being provided with a pair of sprockets mounted at the opposite ends of said frame, an endless chain passing around said sprockets, and at least one intermediate sprocket having involute teeth and disposed between said pair of sprockets for engagement with said endless chain on the tight side thereof; said apparatus further comprising means secured to said endless chain for carrying loads to be conveyed, and means for driving said intermediate sprocket.

An embodiment of the invention will now be described by way of example with reference to the accompanying drawings in which.

Figure 1:
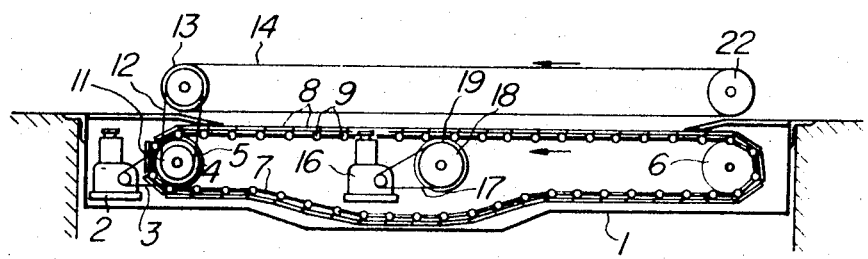
FIG. 1 is a diagrammatical side view of a moving path employing a conveying apparatus in accordance with the present invention.

The conveying apparatus shown in the drawings comprises a pair of chain transmission means which are mounted on a frame 1 and which are laterally spaced apart in a relationship opposed to each other. In FIG. 1 only one of the chain transmission means is visible. Each chain transmission means has a driving sprocket 5 and an idle sprocket 6 which are mounted at the opposite ends of the frame 1 and further has an intermediate driving sprocket 19 which is disposed between the driving sprocket 5 and the idle sprocket 6. Each of the endwise sprockets 5 and 6 has conventional teeth such as ASA teeth or DIN teeth and the intermediate sprocket 19 has involute teeth. The driving sprockets 5 and 19 are driven by synchronized motors 2 and 16 respectively through chains 3 and 17 and sprockets 4 and 18 respectively. An endless chain 7 having a plurality of support rollers 9 is disposed so as to pass around the sprockets 5 and 6. The apparatus may comprise one or more than three chain transmission means as the occasion demands.

A plurality of equally spaced step plates 8 are mounted to cross rods 15 the opposite ends of which are secured to the support rollers 9 of the chain 7. The reference numeral 11 shows a sprocket which is coaxial with the sprockets 4 and 5 and which is provided for driving a hand rail 14. The rotation of the sprocket 11 is transmitted through a chain 12 to a hand rail driving pulley 13 which in turn moves the hand rail 14 at the same speed as the endless chain 7 and the step plate 8. The hand rail 14 is stretched between the driving pulley 13 and an idle pulley 22. The apparatus may have two hand rails which are laterally spaced apart in a relationship opposed to each other.

As clearly seen in the drawings, the sprocket 5 is disposed at one end as in a conventional arrangement and the sprocket 19 is disposed at a position nearly intermediate between the sprockets 5 and 6 so as to mesh with the endless chain 7 on the tight or tension side thereof.

Figure 4:
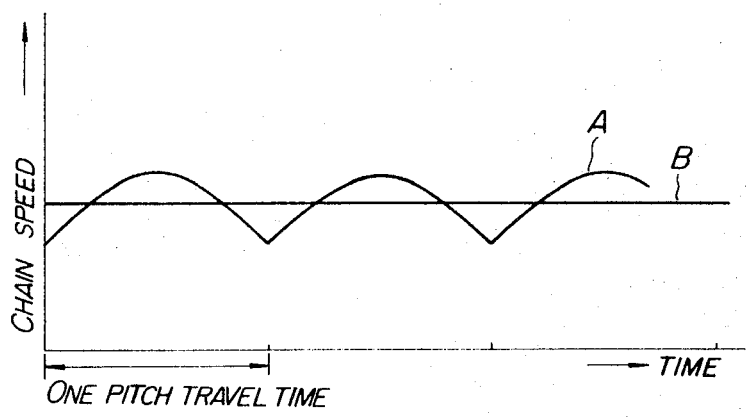
FIG. 4 is a diagram showing the relation between the chain speed and time.

In this arrangement, the driving means provided at one end is the same as a conventional one and the sprocket 5 has conventional teeth such as ASA teeth. Therefore, due to the nature of the chain and sprocket, the chain speed slightly varies during every one pitch travel of the chain as shown by the curve A in FIG. 4. The line B in FIG. 4 shows the average chain speed.

Figure 5:
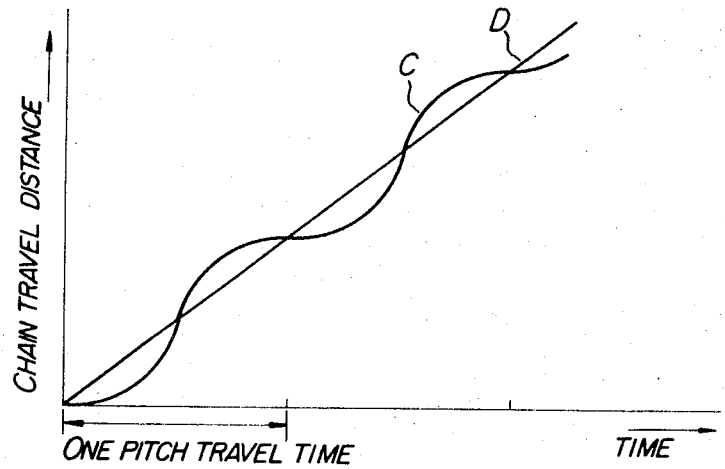
FIG. 5 is a diagram showing the relation between the distance of chain travel and time.

FIG. 5 shows by the curve C the actual travel distance of the chain and by the line D the average travel distance.

In a sprocket having conventional ASA teeth or the like, such a fluctuation of chain speed cannot be avoided. Therefore, in an arrangement where an intermediate drive sprocket has conventional teeth, the fluctuations of chain speed are duplicated and the chain is subjected to excessive tension unless the two drive sprockets rotate in the same phase. Further, in this type of arrangement, since there is some difference in pitch between the addendum and the dedendum of the teeth of the sprocket, the teeth of the sprocket intermittently engage with the roller of the endless chain so that a sprocket having conventional teeth cannot be used as an intermediate drive sprocket.

In the mechanism of engagement between a sprocket and the tight side of an endless chain, only the order of one tooth of the sprocket is normally in engagement with the chain roller and there exists a substantial gap between the engaging tooth and a roller of the chain so that, when the two driving sprockets in the aforementioned arrangement are driven at the same speed, at certain moments a tooth of the intermediate sprocket may possibly fail to engage with the chain roller. Thus, at some instants the intermediate sprocket may possibly be put in a condition wherein the driving force of the sprocket does not act on the chain. As a result, the tension to be applied to the endless chain is entirely born merely by the endwise drive sprocket.

In view of these disadvantages, the present invention proposes to use a sprocket having involute teeth as the intermediate drive sprocket 19 so that it can drive the chain smoothly at a constant speed. According to the present invention, the pressure angle between a tooth of the intermediate drive sprocket and a roller of the endless chain is selected to substantially zero degrees. Otherwise, smooth movement of the endless chain cannot be expected. Further, according to the present invention, the intermediate sprocket is so designed that the number of engaging teeth is more than one at all times in order to ensure the smooth operation of the endless chain. In a preferred embodiment of the present invention, the number of engaging teeth is one or two. With such an arrangement, stable meshing engagement between the endless chain 7 and the sprocket 19 can always be ensured, and the endless chain 7 can be moved at a speed which is the same as the peripheral speed of the sprocket 19 on the pitch circle thereof. In other words, the chain can be moved at a speed as shown by the line B in FIG. 4 and its travel distance can be shown by the line D in FIG. 5.

Even with this arrangement, the fluctuations of the chain speed which may be produced by the end drive sprocket 5 may cause to some extent fluctuations in the tension of the chain. However, the extent of such fluctuation of the chain speed is very small so that, in case where the endless chain 7 has a substantial length, the fluctuation of the chain tension is absorbed by the resiliency of the chain and no critical problems arise. Moreover, since the sprocket 19 is always maintained in engagement with the endless chain 7, the fluctuation of the chain tension created by the end sprocket 5 will not be transmitted beyond the intermediate sprocket 19.

In the illustrated arrangement, when the chain 7 is driven in the direction shown by the arrow in FIG. 1, the drive sprocket 5 shares the load imparted on the left hand half or the portion of the chain between the sprockets 5 and 19, and the drive sprocket 19 drives the load on the portion and the return part of the chain.

Since the load on the left hand half of the endless chain is not always the same as that on the right hand half, the teeth of the drive sprockets 5 and 19 are not subjected to the same amount of force, however, if the driving speeds of the sprockets are always the same, the share of the load by each sprocket remains unchanged. Therefore, it is sufficient that the endless chain 7 has adequate strength to bear the largest of the above-mentioned loads.

In order to synchronize the chain drive speed of the drive sprockets 5 and 19, the motors for the sprockets may be electrically connected together so that the motor torque variation due to the load variation is detected and utilized to synchronize the rotational speeds of the motors.

Figure 6:
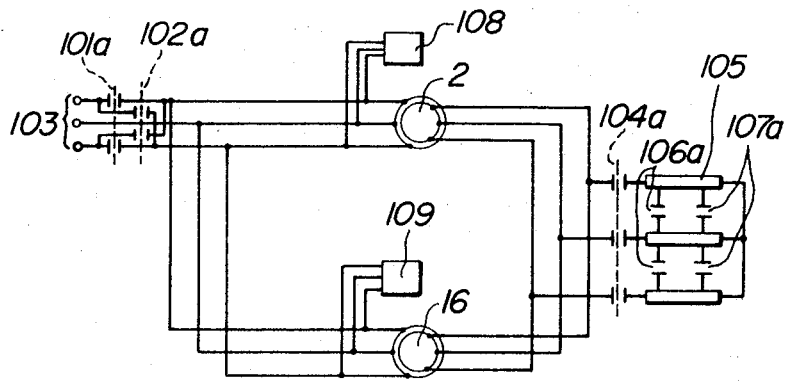
FIG. 6 shows a circuit for synchronizing the sprocket driving motors.

For example, as shown in FIG. 6, in order to synchronize two wound-rotor type three phase induction motors 2 and 16, the primary sides of the motors are connected together, and two phases of each motor are respectively connected through the normal and reverse rotation electromagnetic contacts 101a and 102a of an electromagnetic contactor to a three phase AC power source 103 while the remaining phase is directly connected to the power source. Further, the secondary sides of the motors 2 and 16 are also connected together and further joined through secondary resistance contacts 104a of the electromagnetic contactor to common secondary resistances 105. The secondary resistances 105 are short circuited at portions thereof by contacts 106a and 107a of the electromagnetic contactor. By this arrangement, the motors 2 and 16 can be synchronized. The reference numerals 108 and 109 show mechanical brakes which can be released, when the motors are connected to the power source, by the release coils which are connected to the primary sides of the motors.

Figure 2:
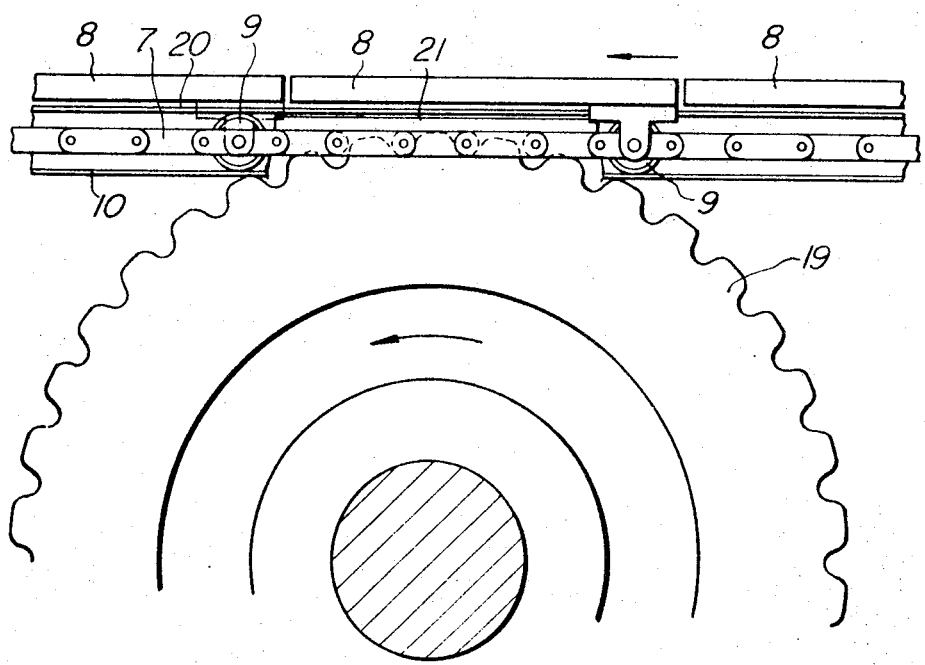
FIG. 2 is an enlarged detailed view of the intermediate driving section in the conveying apparatus shown in FIG. 1.
Figure 3:
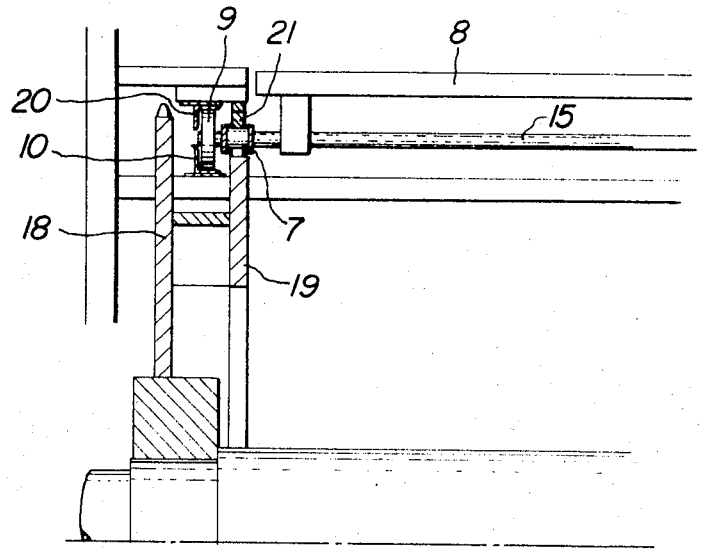
FIG. 3 is a sectional view of the section shown in FIG. 2.

The intermediate drive sprocket 19 is constantly in engagement with the endless chain 7 on the tight side thereof. However, for some reasons, if the force produced at the point of engagement acts to push the rollers of the endless chain 7 upwardly, the points of meshing engagement will become off the pitch circle of the sprocket resulting in inaccurate meshing. Therefore, according to a preferable aspect of the present invention, as shown in FIGS. 2 and 3, there is provided an upper constraining rail 20 as well as a lower guide rail 10 for the support rollers 9 one each being for every step plate 8. Moreover, another upper constraining rail 21 is provided for the rollers of the endless chain 7 in order to prevent the rising of the chain roller around the point of engagement between the intermediate drive sprocket and the endless chain.

In the illustrated embodiment of the present invention, only one intermediate drive means is provided, however in the case where the moving path has a substantial length, a plurality of such intermediate drive means may be used. Further, in the illustrated embodiment, a conventional end drive sprocket is used in combination with the intermediate drive means. In an application where any end drive means cannot be employed, a plurality of intermediate drive sprockets having involute teeth may be used in accordance with the present invention in order to achieve the same purpose. Furthermore, in an application where the apparatus requires only one drive means, only one intermediate drive means may be used in accordance with the present invention. The present invention has thus been described with reference to one embodiment relating to a moving path and it can also be applied to an escalator or to a conveyor without any difficulty.

What is claimed is:

1. Conveying apparatus comprising a frame; and at least one chain transmission means mounted on said frame; each of said chain transmission means including a pair of sprockets mounted at the opposite ends of said frame, one of said sprockets being a drive sprocket, the other being an idle sprocket, said drive sprocket and said idle sprocket have standard ASA teeth or DIN teeth, an endless chain passing around said sprockets, and at least one intermediate sprocket having involute teeth and disposed between said pair of sprockets for engagement with said endless chain on the tight side thereof; means for synchronously driving said drive sprocket and said at least one intermediate drive sprocket, said apparatus further comprising means secured to said endless chain for carrying the load to be conveyed.

2. Conveying apparatus in accordance with claim 1, which further comprises means provided at the portion of engagement between said at least one intermediate drive sprocket and said endless chain for preventing any rising movement of said endless chain.

3. Conveying apparatus in accordance with claim 1 wherein said means for synchronously driving said drive sprocket and said at least one intermediate drive sprocket comprise a pair of means, one driving said drive sprocket and the other driving said at least one intermediate drive sprocket.

4. Conveying apparatus in accordance with claim 1 wherein said means for synchronously driving said drive sprocket and said at least one intermediate drive sprocket comprise a pair of motors electrically connected together so that motor torque variations due to load variations are detected and utilized to synchronize the rotational speeds of the motors.

5. A moving path or an escalator for conveying passengers, comprising a frame; and at least one chain transmission means mounted on said frame; each of said chain transmission means including a pair of sprockets mounted at the opposite ends of said frame, one of said sprockets being a drive sprocket, the other being an idle sprocket, said drive sprocket and said idle sprocket have standard ASA teeth or DIN teeth, an endless chain passing around said sprockets, and at least one intermediate sprocket having involute teeth and disposed between said pair of sprockets so as to engage with said endless chain on the tight side thereof; means for synchronously driving said drive sprocket and said at least one intermediate drive sprocket, and further comprising a plurality of step plates secured to said endless chain for carrying passengers; and one or two hand rails driven at a speed which is the same as the moving speed of said step plates.

6. A moving path in accordance with claim 5, which further comprises means provided at the portion of engagement between said at least one intermediate drive sprocket and said endless chain for preventing any rising movement of said endless chain.

7. A moving path in accordance with claim 5 wherein said means for synchronously driving said drive sprocket and said at least one intermediate drive sprocket comprise a pair of means, one driving said drive sprocket and the other driving said at least one intermediate drive sprocket.

8. A moving path in accordance with claim 5 wherein said means for synchronously driving said drive sprocket and said at least one intermediate drive sprocket comprise a pair of motors electrically connected together so that motor torque variations due to load variations are detected and utilized to synchronize the rotational speeds of the motors.

9. A moving path in accordance with claim 5 wherein said drive sprocket and said idle sprocket have standard ASA teeth or DIN teeth.

* * * * *